June 15, 1971  R. V. GREEN  3,584,998
PROCESS FOR MAKING AMMONIA
Filed July 3, 1968

INVENTOR
RALPH V. GREEN

ATTORNEY

United States Patent Office

3,584,998
Patented June 15, 1971

3,584,998
PROCESS FOR MAKING AMMONIA
Ralph V. Green, Charleston, W. Va., assignor to E. I. du Pont de Nemours and Company, Wilmington, Del.
Filed July 3, 1968, Ser. No. 742,347
Int. Cl. C01c 1/04; B01j 9/00; C01b 2/02
U.S. Cl. 23—199
2 Claims

ABSTRACT OF THE DISCLOSURE

Ammonia is made without using a primary reformer by preheating the air, steam and natural gas to about 2000° F. and reacting these streams in a secondary type reformer. The synthesis gas is then fed in sequence to a heat recovery unit, a shift converter, a $CO_2$ absorber, a methanator if necessary, and then to a low temperature purifier which removes the excess nitrogen, methane and carbon monoxide. The purified stream is then compressed and converted into ammonia in the synthesis converter.

BACKGROUND OF THE INVENTION

Nitrogen in various chemical combinations is an essential constituent of most fertilizers. Although an abundant supply of atmospheric nitrogen is readily available, it must be converted into a "fixed" form suitable for use as a fertilizer. The principal source of fixed nitrogen used in the manufacture of fertilizers is ammonia.

The principal industrial process developed for the production of ammonia involves the reaction of hydrogen from petroleum products, e.g. natural gas, with atmospheric nitrogen to form ammonia.

The major steps involved in this process are gas preparation, carbon monoxide conversion, gas purification, and ammonia synthesis.

In the typical ammonia plant natural gas is converted to ammonia synthesis gas by the steam reforming process using primary and secondary reformers.

Considerable research and development work has been performed during the past 15 years in an effort to reduce the costs of producing hydrogen and purifying ammonia synthesis gas. However, improvements are still desired that will reduce the capital cost of new ammonia plants and also reduce operating and maintenance costs.

BRIEF SUMMARY OF THE INVENTION

I have discovered that the typical process for making ammonia can be improved by the elimination of the primary reformer if a low temperature purifier is used in the process.

The process of the invention has the advantage that the large and complicated primary reformer and its catalyst can be omitted.

DETAILED DESCRIPTION OF THE INVENTION

Figure 1:
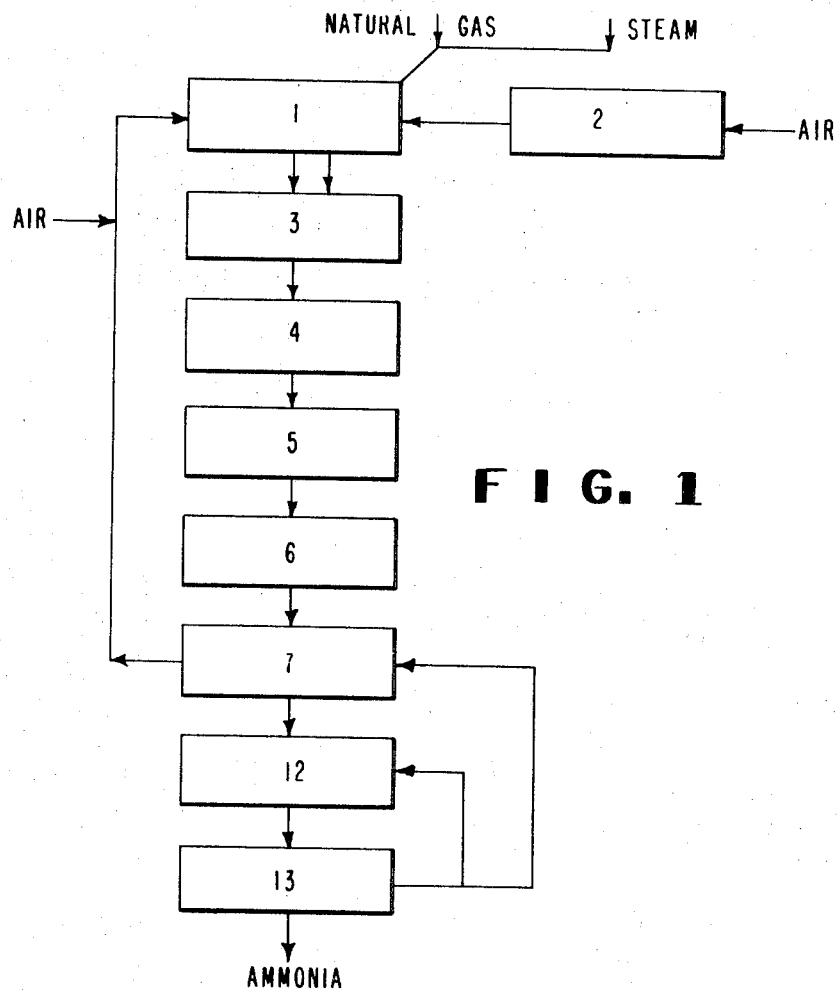
FIG. 1 is a flow chart of the process of the invention.

The process of the invention, except for the absence of the primary reformer and the inclusion of a low temperature purifier, is essentially the same as the typical art process. In this respect, conventional units, catalysts, and operating conditions are used as will be set out in detail hereafter.

The main raw materials used for hydrogen production in an ammonia process are either natural gas, naphtha, fuel oils, or refinery gases, particularly natural gas or naphtha. The following discussion will be directed to the use of natural gas.

Desulfurized natural gas at 200 to 1500 p.s.i.g. is mixed with superheated steam and fed into a preheater 1. Air from an air compressor 2 is separately fed into this unit and heated. The heated steam-gas and air streams are heated up to about 2000° F., usually about 1500° F.

The gas-steam and air streams are then fed into a conventional secondary reformer 3 to produce hydrogen. The amount of air added is controlled to provide sufficient oxygen to reform the residual methane and to supply more than enough of the nitrogen needed to give a 3:1 ratio of hydrogen to nitrogen in the synthesis make-up gas. This reformer contains a conventional nickel-base catalyst and is operated at pressures up to 1500 p.s.i.g., usually about 300 to 500 p.s.i.g.

In this reformer the methane in the natural gas is reformed to produce a reformer gas composed of carbon oxides, hydrogen, nitrogen, excess steam and a minor amount of unconverted methane. This amount of methane will normally be higher than that obtained when both primary and secondary reformers are used. The reformer gas, in view of the excess of air feed into the secondary reformer, will be nitrogen rich. This excess nitrogen and methane will be removed subsequently by the low temperature or cryogenic purifier.

The reformer gas is fed into the waste heat boiler unit 4 where it generates steam or it can be used to preheat the initial feed streams of natural gas, steam and air. Condensate is added to the gas as necessary to control its temperature and to provide excess steam for the shift reaction which follows.

The reformer gas at a temperature of about 700°–900° F. then passes into a shift converter 5. In this converter, the catalyst present converts the carbon monoxide present in the reformer gas into hydrogen by reaction with steam in the presence of the catalyst.

This shift converter can be a conventional 2-stage unit which contains multiple beds of catalyst and operates at pressures up to 200 p.s.i.g. or higher. The first bed is a conventional high temperature shift catalyst, e.g., an iron-chromium shift catalyst. This bed reduces the carbon monoxide content to 3% or less. The gas leaving the first bed is cooled to about 350°–500° F. and then flows through a bed of zinc oxide to remove any chlorides or sulfur present. The gas then flows to a bed of high activity low temperature shift catalyst such as one containing chromium, copper and zinc or an iron catalyst if the $CO_2$ is removed after the first shift wherein the carbon monoxide content is reduced to 0.2 to 0.3%. The converted gas leaving the shift converter is essentially all hydrogen, nitrogen and carbon dioxide with minor amounts of methane and carbon monoxide.

If desired a 1-stage shift converter can be used; however, use of the conventional high and low staged shift converter is preferred.

Converted gas leaving the shift converter flows to the scrubber 6 where carbon dioxide is removed by countercurrent scrubbing with monoethanolamine (MEA) solution. The carbon dioxide-rich MEA from the absorber can be regenerated by stripping with steam in a separate tower, and recirculated. Other scrubbing agents can be used, such as potassium carbonate, "Sulfinol," the dimethyl ethers of polyethyleneglycol, acetone, water; however to conserve steam some of the solvents with a high $CO_2$ capacity are preferred.

Gas leaving the scrubber 6 can then be fed through a methanator unit operated at about 600° F. where the residual carbon monoxide (about 0.3%) and carbon dioxide (less than 0.10%) are converted to methane by reaction with hydrogen in the presence of a nickel base catalyst. In many operations, the methanator will not be necessary.

Figure 2:
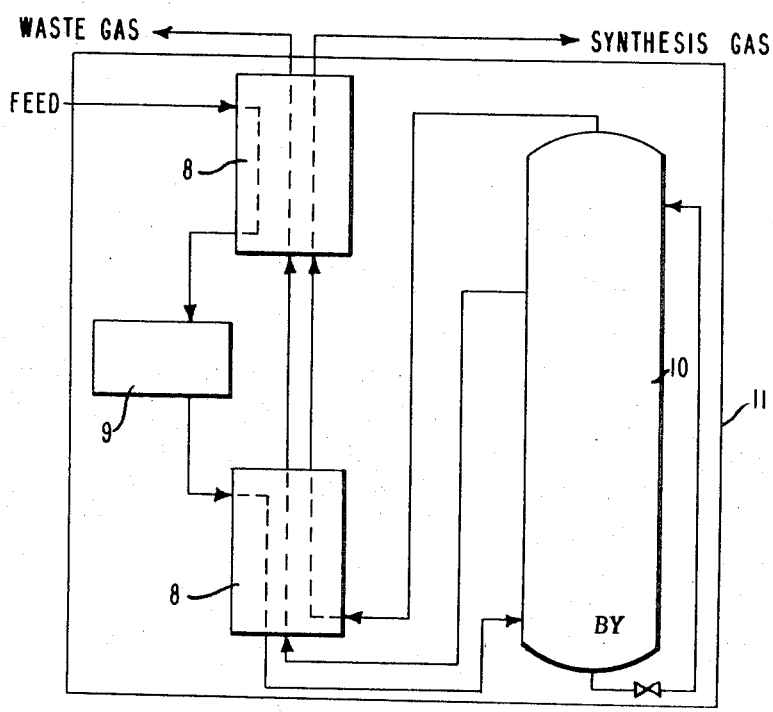
FIG. 2 is a flow chart of a cryogenic purifier.

The converted and scrubbed gas is then fed, with or without being methanated, into a cryogenic purifier 7. This unit provides a high purity gas for ammonia synthesis by removing the last traces of water and $CO_2$, excess cryogenic purifier consists of a drier, feed effluent heat exchanger, a gas expander, a vapor-liquid contacting rectifier column, and a reflux condenser. FIG. 2 is a schematic flow plan of this unit.

The unit is composed of a heat exchanger 8 in two sections, an expander 9, and a rectifier-condenser 10.

The feed-effluent heat exchanger 8 is a high surface heat exchanger of the type normally used for cryogenic service. The design provides for cooling the feed gas by simultaneous heat exchange with both the purifier product, i.e., the synthesis gas, and the vent gas, i.e., the waste gas. The feed is extracted from the exchanger at a temperature well above the dew point and passed through the turbo-expander 9 to develop the net cooling. The gas expander can be a radial-inflow reaction turbine with variable inlet nozzles to permit control of the power extraction.

The rectifying column and reflux condenser 10 can be constructed as a single unit. The rectifier contains vapor-liquid contacting devices such as aluminum rings, sieve trays, or bubble cap trays. The reflux condenser consists of a vertical shell-and-tube heat exchanger which can be integrally mounted on the top of the rectifying column by having the bottom tubesheet of the exchanger form the top of the column. Vapor from the rectifying column flows upward in the tubes, and is partially condensed to provide reflux for the rectifier. The purified synthesis gas leaves from the top head of the condenser.

All the purifier apparatus including column, exchanger and expander are installed in a cold box 11 which is filled with insulation, then pressured with a dry nitrogen to prevent inleakage of moisture.

The feed to the purifier will contain about 60 to 70% hydrogen, 30 to 40% nitrogen, 2 to 3% methane, and about 0.5% argon. The feed should be dried to remove all water and other components which tend to freeze in the cryogenic step. After water removal, the feed is cooled to a temperature in the range of −200° F. to −250° F. in the first heat exchanger section by heat exchange with the two effluent streams. It then passes through the turbo-expander to provide the required cryogenic refrigeration. The feed is further cooled to a temperature in the range of −250° F. to −300° F. in the second section of the heat exchanger and then enters the rectified column. The gas leaving the top of the column is a 3 to 1 hydrogen-nitrogen mixture containing about 0.2% argon and only a trace of methane.

The product synthesis gas and the vent gas leaving the rectifier condenser are reheated by heat exchange with the feed. The effluent streams leaving the unit are approximately 5° F. cooler than the feed.

The purifier removes over 99% of the methane and about 65% of the argon in the feed. The waste gas containing the methane, along with the excess nitrogen, is mixed with air and used as fuel for the preheater 1.

The purified make-up gas, consisting essentially of hydrogen and nitrogen in the proper ratio, is compressed for ammonia synthesis in the compressor 12. Reciprocating compressors can be used to boost the make-up gas pressure to 4,000 to 10,000 p.s.i.g. for ammonia synthesis, or centrifugal compressors can be used and ammonia synthesized at pressures as low as 1,800 p.s.i.g.

The compressed make-up gas is combined with synthesis recycle gas and fed into the synthesis converter 13. Here the reaction between hydrogen and nitrogen occurs:

$$3H_2 + N_2 \rightleftarrows 2NH_3$$

Converter incoming gas is heated through exchange with outgoing gas and heat of reaction in the catalyst bed is sufficient to maintain catalyst temperature. Although the ammonia content of the gas at equilibrium is increased by high pressure and low temperature, a catalyst temperature of about 900° F. allows a satisfactory reaction rate. The temperature generally ranges from 750° F. at bed inlet to 1000° F. at bed outlet. The conventional ammonia catalyst can be used, it is composed of iron oxide ($Fe_3O_4$ and FeO) promoted with aluminum, potassium, and calcium oxides. The catalyst is charged into the converter. However, both the oxidized and pre-reduced types of catalyst can be used.

After passing through the synthesis loop, the ammonia is cooled and condensed. The unreacted gas is recycled to the compressor.

The purge gas from the synthesis section is scrubbed with water and sent to the purifier 7 where the inert gases argon and methane are removed and the hydrogen recovered.

In an exemplary embodiment of the process of the invention, 300 mols/hour of steam at 500° F. and 100 mols/hour of natural gas at 60° F. are mixed and heated in a preheater to 1475° F.

Air, 238 mols/hour, at 1475° F. is mixed with the heated gas-steam stream and the streams are fed into a secondary reformer. The reformer gas, 793 mols/hour at 1700° F. is cooled to 700° F. and fed into the first stage of the shift converter. The gas is then cooled to 450° F. and fed into the second stage.

The output of the shift converter at 500° F. is fed into the scrubber. The scrubber produces 496 mols/hour of a gas having the following content:

| | Percent |
|---|---|
| Hydrogen | 60.18 |
| CO | .60 |
| $CO_2$ | .10 |
| Nitrogen | 38.11 |
| Methane | 1.01 |

This gas is dried and fed into the cryogenic purifier. The synthesis gas from the purifier, 387 mols/hour, is compressed and fed into the converter. 1.645 tons/hour of ammonia is obtained.

I claim:
1. A process for the synthesis of ammonia comprising the following sequential steps:
  (a) preheating feed streams of desulfurized natural gas or naphtha and excess air and steam up to about 2000° F.,
  (b) reforming said feed stream in a single step by passing said feed streams over a catalyst bed in a secondary type reformer at temperatures up to about 2000° F. to provide nitrogen rich reformer gas,
  (c) passing said reformer gas through a shift converter to provide converted gas,
  (d) scrubbing said converted gas to remove carbon dioxide,
  (e) treating said scrubbed gas in a cryogenic purifier to remove excess nitrogen, methane, argon, and carbon monoxide,
  (f) compressing said treated gas to 1,800 to 10,000 p.s.i.g.,

(g) converting said compressed gas at 1,800 to 10,000 p.s.i.g. in a synthesis converter to provide ammonia.

2. The process of claim 1 with the additional step of passing the scrubbed converted gas through a methanator to remove the carbon monoxide prior to treating said gas in the cryogenic purifier.

References Cited

UNITED STATES PATENTS

| | | | |
|---|---|---|---|
| 2,166,611 | 7/1939 | Shapleigh | 23—199 |
| 3,442,613 | 5/1969 | Grotz, Jr. | 23—199 |

OTHER REFERENCES

"Manufacturing Processes for Ammonia," American Society of Agronomy, Symposium on Anhydrous Ammonia (1966), pp. 1–20.

"Syngas Purifier Cuts Ammonia Costs," by B. J. Grotz, Hydrocarbon Processing, April 1967, pp. 197–202.

OSCAR R. VERTIZ, Primary Examiner

H. S. MILLER, Assistant Examiner

U.S. Cl. X.R.

23—289; 252—374